United States Patent [19]
Ruth et al.

[11] Patent Number: 5,626,980
[45] Date of Patent: May 6, 1997

[54] CONTACT BLOCK IN A BATTERY PACK HAVING SNAP IN FEATURES

[75] Inventors: Barbara A. Ruth, Cumming; Aaron P. Clark, Buford; Micheal M. Austin, Lilburn; Raymond J. Kleinert, Atlanta, all of Ga.

[73] Assignee: Motorola, Inc., Schaumburg, Ill.

[21] Appl. No.: 520,359

[22] Filed: Aug. 28, 1995

[51] Int. Cl.$^6$ .................................................. H01M 2/10
[52] U.S. Cl. ............................ 429/100; 429/96; 429/99
[58] Field of Search ........................... 429/99, 100, 96

[56] References Cited

U.S. PATENT DOCUMENTS 4,391,882  7/1983  Saruwatari ...................... 429/96
5,180,644  1/1993  Bresin et al. ..................... 429/99 X
5,421,745  6/1995  Aksoy et al. .................... 439/626

*Primary Examiner*—John S. Maples
*Attorney, Agent, or Firm*—Kenneth M. Massaroni

[57] ABSTRACT

A contact block (10) is provided with a first ledge (34) and a second ledge (38) that deflectably engage a first edge (46) and a second edge (48) of an opening (44) in the housing (42) of an electrical device. The contact block (10) mechanically supports at least one electrical contact (14) to provide a contact surface (18) whereby the first electrical device (40) may be electrically interconnected with a second electrical device (60). The contact block (10) is snapped into place during assembly until it is secured during a final assembly operation.

12 Claims, 4 Drawing Sheets

CONTACT BLOCK IN A BATTERY PACK HAVING SNAP IN FEATURES

TECHNICAL FIELD

This invention relates in general to connectors for electrical devices, and more particularly to contact blocks for supporting electrical contacts used for electrically interconnecting electrical devices.

BACKGROUND

Electronic and electrical devices are being made for an increasing number of applications. Cellular phones, palm top computers, scanners, power tools, and digital cameras are but a few examples. Many of these devices must electrically interconnect with another device, typically at least a battery pack and a battery charger. The electrical connections required to successfully mate two devices must be mechanically supported to ensure sufficient pressure between the device connectors.

There are a large number of connector styles currently being marketed. These can all be lumped into one of three categories: pin, card edge, and surface. The pin type connectors comprise variations of the male-female type connector in which a pin shaped conductor offered by a first device is received in a corresponding socket of a second device. The card edge type connectors are typically found in computer systems applications where a sub-system board is added to a larger system. Conductor traces or runners are deposited on circuit boards at the edge of the board and are connected to the circuit of the board. These edges are received in a corresponding socket when the board is installed. Surface type connectors rely on pressing two generally flat conductor surfaces together to make the connection. This type is the most versatile and has a wide variety of embodiments.

Of the three, the surface type is most suited for rugged applications. Pin type connectors work well in applications where the equipment is generally stationary during operation, such as power cords or computer cables. If they experience rough treatment it's likely that the pins will shear off, and disable the equipment. Edge type connectors are intended for an even more lasting connection. Once a board is installed it is typically a period of months, and likely years before it is removed. These type of connectors do not bear repeated installation and removal because it wears down the conductor on the board edge. Surface type connectors however offer a durable and rugged alternative. Many systems take advantage of this type of connector including, but not limited to, telephone jacks, automotive connectors, and battery packs.

The typical surface contact is a flat conductor mechanically supported by an electrically insulative material such as plastic. In many applications there are numerous electrical connections that need to be made between two electrical devices, and care must be taken to ensure proper alignment. One common way of providing alignment of contacts between two devices is to employ a connector or contact block. The contacts are embedded in a block of, for example, plastic, leaving the contact surface exposed on a portion of the block.

However, while the contact block approach has solved the problem of alignment between adjacent contacts, problems during assembly have come to light. A significant drawback to the contact block approach is the time needed for assembly of a device incorporating one. Care must be taken to insure that the block stays in place while the various device component are assembled until the block can be secured. Therefore there exists a need to provide a contact block with a means to secure it's position during assembly until the block can be secured in place.

DETAILED DESCRIPTION OF THE PREFERRED EMBODIMENT

Figure 1:
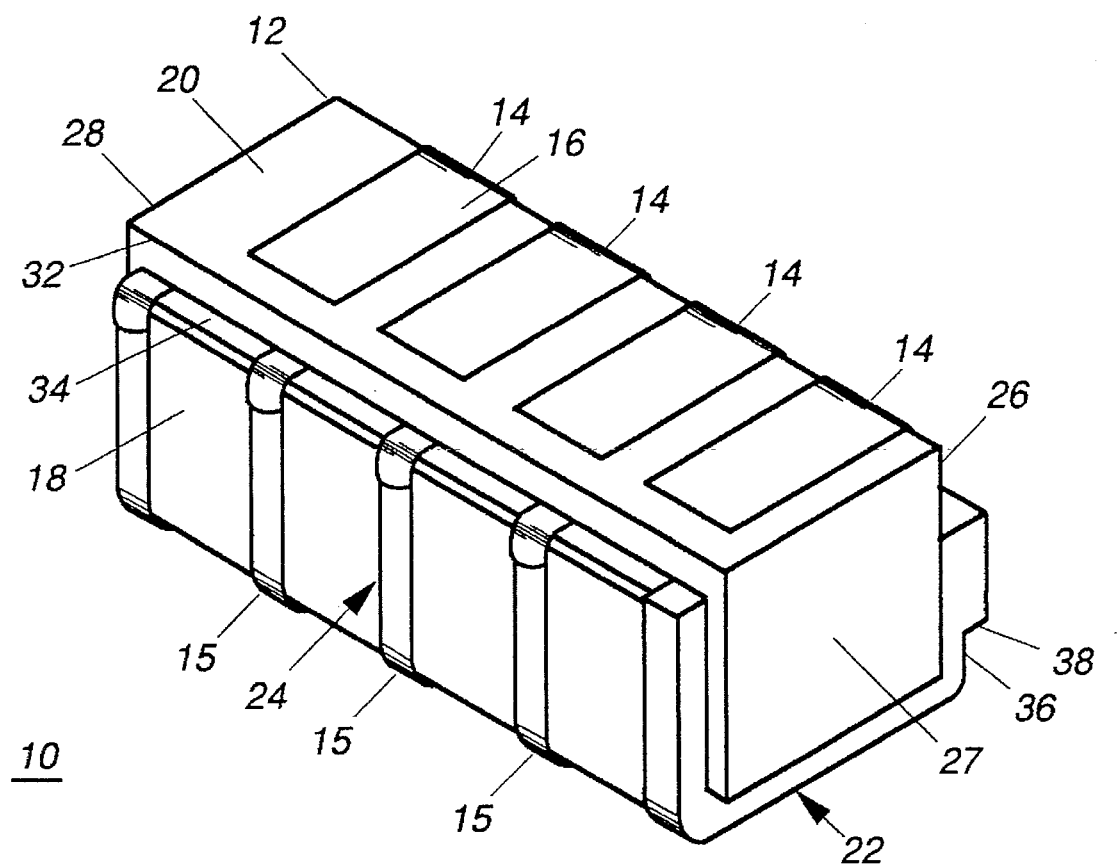
FIG. 1 is a perspective view of a contact block in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, where there is illustrated therein a perspective view of a contact block 10 in accordance with the instant invention. The contact block has a body 12 which is fabricated from an electrically insulative material such as, for example, plastic. At least one electrical contact 14 is disposed in the body 12, and has a first contact surface 16 and a second contact surface 18. The electrical contact is fabricated from an electrically conductive material, and is preferably a metal insert molded into the body 12. In many cases, at least two electrical contacts will be required, and when two or more are present, they are preferably recessed slightly into the body 12 so that ridges 15 separate the electrical contacts. The purpose of recessing the electrical contacts is to reduce the risk of shorting the contacts together, such as by a coin or keys.

In general, the body 12 has six surfaces such as top 20, bottom 22, front 24, back 26, and two opposing sides 27 and 28. The first contact surface 16 may be located, for example, on top 20, and the second contact surface on another surface such as front 24. It is contemplated that a third contact surface 30 may be used in some cases, and as such, the third contact surface 30 could be located on the bottom 22 of the body. In all instances where a contact surface is located on a surface of the body, the contact surface and the body surface are generally co-planar.

Where two surfaces come together, an edge is defined. Top 20 and front 24 define a first edge 32, which has a first ledge 34 formed along the length of the first edge. It is contemplated that the first ledge need not be formed along the entire length of the first edge, but should be formed along at least a portion of the first edge. Similarly, a second edge 36 is defined where bottom 22 and back 26 meet, and a second ledge 38 is formed along second edge 36.

Figure 2:
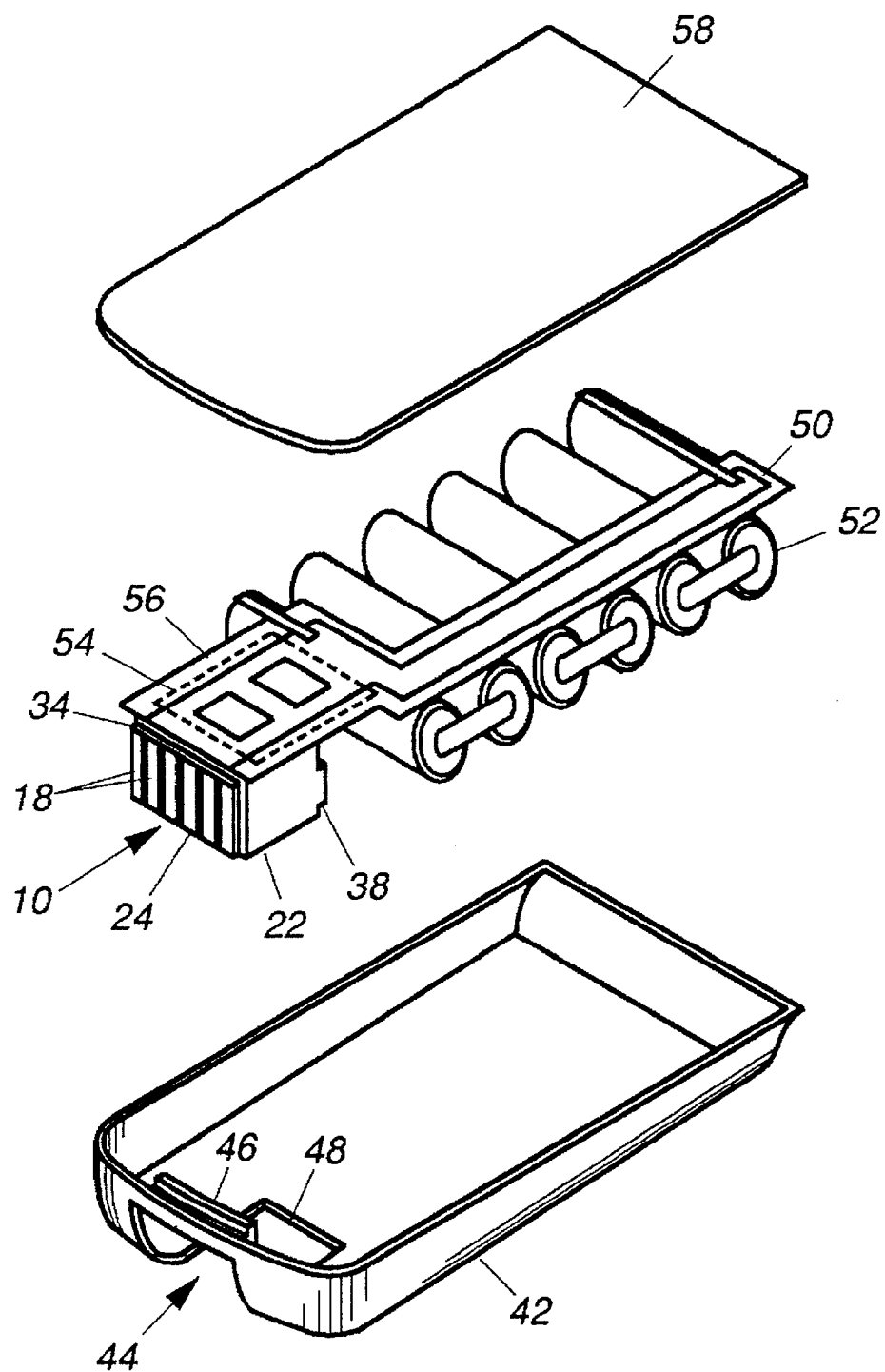
FIG. 2 is an exploded view of a battery pack in accordance with the invention.

To illustrate how contact block 10 functions in an electrical device, FIG. 2 shows the incorporation of the contact block into a battery pack 40. Referring now to FIG. 2, there is illustrated therein generally an exploded view of a battery pack 40. The battery pack comprises housing 42 which is preferably molded plastic, and is somewhat resilient. An opening 44 is formed in the housing, and has a first edge 46 and a second edge 48. Both edges of the opening 44 are chamfered to facilitate assembly, as will be described below.

Contact block 10 is shown connected to an electrical circuit 50, which in the case of a battery pack, includes at least one battery cell 52. The circuit components 54 may be carried on a flexible circuit board 56. In other cases the circuit board 56 may be a more typical rigid board, but it is preferred that the connection between the board and contact block be a flexible carrier, the carrier being connected to the first contact surface(s) shown in FIG. 1. This will facilitate assembly.

Upon assembly, the circuit portion comprising contact block 10, electrical circuit 50, and battery cell(s) 52, is placed into housing 42. The contact block is snapped into place in opening 44 by engaging the front 24 of the contact block with the first edge of the opening, and the bottom 22 of the contact block with second edge of the opening. A small amount of force applied to the contact block is transmitted to the edges of the opening, causing them to deflect slightly, until first ledge 34 and second ledge 38 become engaged with first edge 46 and second edge 48, respectively. This produces both audible and tactile feed back; a snap can be heard and felt by someone assembling the device. When assembled, contact surface 18 is accessible through opening 44. By snapping the contact block into place, it is held throughout the assembly process. The battery pack 40, or similar electrical device, can be manipulated without moving the contact block out of it's position. In practice this significantly improves assembly time of an electrical device, such as battery pack 40. Once the circuit portion is in place, and contact block 10 is engaged, cover 58 is attached to housing 42 by, for example, ultrasonic welding. The final position of the cover is such that it locks the contact block in place, and thereby prevents unintentional disengagement of the contact block from the housing.

Figure 3:
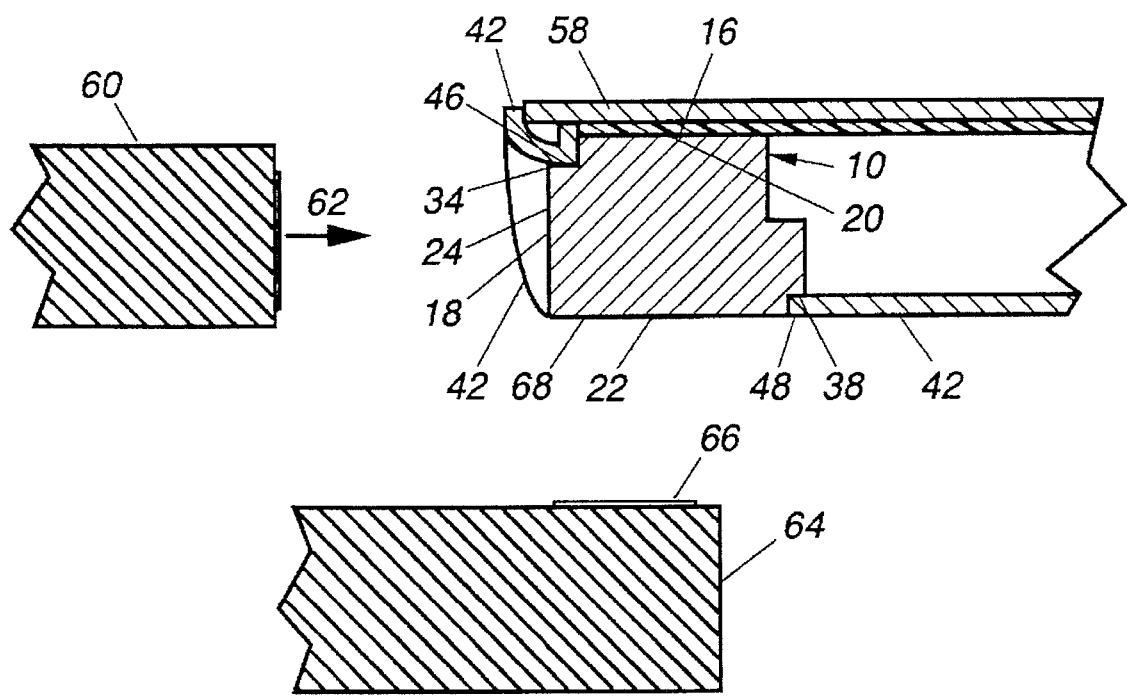
FIG. 3 is a side cutaway view of a contact block assembled into the housing of an electrical device in accordance with the invention.

FIG. 3 shows the final assembly in more detail. Referring now to FIG. 3, where there is illustrated therein a side cutaway view of contact block 10 assembled into housing 42. From this view the engagement of first ledge 34 and second ledge 38 of the contact block with first edge 46 and second edge 48 of the opening of the housing can be seen. The first contact surface 16 is connected to circuit board or carrier 56, thereby allowing an electrical interconnection through exposed contact surface 18 with a second electrical device 60 when moved in the direction of arrow 62. The second electrical device could be, for example, a charger. In some cases, a third electrical device 64 may be simultaneously connected by contacting contact surface 66 of the third electrical device with a third contact surface 68 of contact 14 on the bottom 22 of the contact block 10. The third electrical device could be, for example, a cellular phone. It is quite common for the exemplary devices given, i.e. a battery pack, charger, and cellular phone, to be simultaneously interconnected. It should be appreciated however that the invention may be practiced in a wide variety of such devices.

Figure 4:
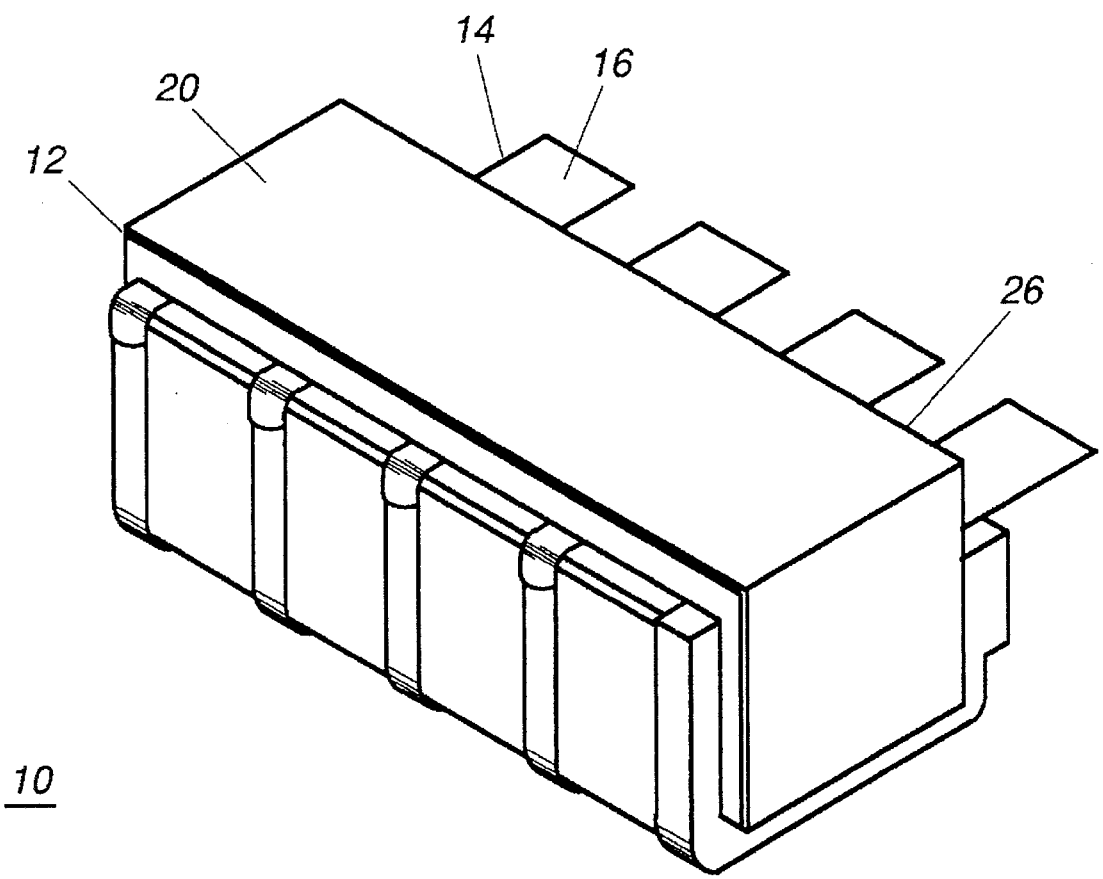
FIG. 4 is a perspective view of an alternative embodiment of a contact block in accordance with the invention.

FIG. 4 illustrates an alternate preferred embodiment of contact block 10. As shown in FIG. 4, electrical contact 14 is configured such that a tab of the conducting material extends from the back 26 of the body 12. This leaves the first contact surface 16 exposed at a position behind the body instead of on the top 20. This provides a location for connecting to a circuit board, as in FIG. 2. However, the back surface of the body acts as a guide to align the circuit board during assembly.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery pack, comprising:

a housing fabricated of an electrically insulative material and having a opening formed therein, said opening having first and second edges;

a battery circuit comprising at least one battery cell disposed in said housing;

a contact block for connecting said battery circuit with an electrical device, said contact block having a body made of an electrically insulative material and having ledges for deflectably engaging said first and second edges of said opening in said housing; and a cover for covering said battery pack and securing said contact block.

2. A battery pack as defined in claim 1, wherein said body of said contact block has a top, bottom, front, back and two opposing sides, said top defining a first edge along said front, said bottom defining a second edge along said back, said contact block comprises:

at least one electrical contact disposed in said body of said contact block, and having a first contact surface for electrically connecting with said electrical circuit of said first electrical device, and a second contact surface for electrically connecting with a second electrical device;

a first ledge formed along at least a portion of said first edge of said body for deflectably engaging said first edge of said opening in said housing; and a second ledge formed along at least a portion of said second edge of said body for deflectably engaging said second edge of said opening formed in said housing.

3. A battery pack as defined in claim 2, wherein said at least one electrical contact further comprises a third surface disposed on said bottom of said body for electrically interconnecting said first electrical device with a third electrical device.

4. A battery pack as defined in claim 2, wherein said at least one electrical contact is at least two electrical contacts.

5. A battery pack as defined in claim 4, wherein said at least two electrical contacts are recessed in said body.

6. A battery pack as defined in claim 2, wherein said first ledge extends along all of said first edge of said body.

7. A battery pack as defined in claim 2, wherein said second ledge extends along all of said second edge of said contact body.

8. A battery pack as in defined in claim 1, wherein said contact block produces both audible and tactile feed back when assembled into said housing.

9. A battery pack comprising:

a housing fabricated of an electrically insulated material and having an opening form therein, said opening having first and second edges;

a battery circuit comprising at least one battery cell disposed in said housing;

a contact block for connecting said battery circuit with a first electrical device, said contact block having a body made of an electrically insulated material and having ledges for deflectively engaging said first and second edges of said opening in said housing, said body of said contact block further comprising a top, bottom, front, back and two opposing sides, wherein said top defines a first edge along said front, said bottom defines a second edge along said back, and said contact block further comprises at least one electrical contact disposed in said body of said contact block, and having a first contact circuit for electrically connecting with said first electrical device, a second contact surface for electrically connecting with a second electrical device, and a third contact surface disposed on said bottom of said body for electrically connecting with a third electrical device; and a cover for covering said battery pack and securing said contact block.

10. A battery pack as defined in claim 9, wherein said at least one electrical contact comprises at least two electrical contacts.

11. A battery pack as defined in claim 10, wherein said at least two electrical contacts are recessed in said body.

12. A battery pack as in claim 9, wherein said contact block produces both an audible and tactile feedback when assembled into said housing.

* * * * *